(12) United States Patent
Ollila

(10) Patent No.: US 11,688,040 B2
(45) Date of Patent: Jun. 27, 2023

(54) IMAGING SYSTEMS AND METHODS FOR CORRECTING VISUAL ARTIFACTS CAUSED BY CAMERA STRAYLIGHT

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 272 days.

(21) Appl. No.: 17/226,172

(22) Filed: Apr. 9, 2021

(65) Prior Publication Data

US 2022/0327666 A1    Oct. 13, 2022

(51) Int. Cl.
| | | |
|---|---|---|
| G06T 5/00 | (2006.01) | |
| G06T 7/00 | (2017.01) | |
| G06T 7/10 | (2017.01) | |
| G06T 19/00 | (2011.01) | |
| H04N 13/167 | (2018.01) | |
| G06T 7/70 | (2017.01) | |
| H04N 23/73 | (2023.01) | |

(52) U.S. Cl.
CPC ............ G06T 5/002 (2013.01); G06T 7/0002 (2013.01); G06T 7/10 (2017.01); G06T 7/70 (2017.01); G06T 19/006 (2013.01); H04N 13/167 (2018.05); H04N 23/73 (2023.01); G06T 2207/10016 (2013.01); G06T 2207/10024 (2013.01); G06T 2207/10028 (2013.01); G06T 2207/30244 (2013.01)

(58) Field of Classification Search
CPC ......... G06T 5/002; G06T 7/0002; G06T 7/10; G06T 7/70; G06T 19/006; G06T 2207/10016; G06T 2207/11024; G06T 2207/10028; G06T 2207/30244; H04N 13/167; H04N 23/73
See application file for complete search history.

(56) References Cited

U.S. PATENT DOCUMENTS

| | | | |
|---|---|---|---|
| 9,646,365 B1 * | 5/2017 | Hinkel | .............. G06T 5/003 |
| 10,430,994 B1 * | 10/2019 | Baker | ................. G06T 7/55 |
| 2002/0131647 A1 * | 9/2002 | Matthews | ........... H04N 19/86 382/268 |
| 2011/0182520 A1 * | 7/2011 | Free | ................. G06V 40/164 345/426 |
| 2019/0096135 A1 * | 3/2019 | Dal Mutto | ........ G06T 7/0006 |

* cited by examiner

*Primary Examiner* — Barry Drennan
*Assistant Examiner* — Jed-Justin Imperial
(74) *Attorney, Agent, or Firm* — Ziegler IP Law Group, LLC (57) ABSTRACT

An imaging system for correcting visual artifacts during production of extended-reality images for display apparatus. The imaging system includes at least first camera and second camera for capturing first image and second image of real-world environment, respectively; and processor(s) configured to: analyse first and second images to identify visual artifact(s) and determine image segment of one of first image and second image that corresponds to visual artifact(s); generate image data for image segment, based on at least one of: information pertaining to virtual object, other image segment(s) neighbouring image segment, corresponding image segment in other of first image and second image, previous extended-reality image(s), photogrammetric model of real-world environment; and process one of first image and second image, based on image data, to produce extended-reality image for display apparatus.

20 Claims, 3 Drawing Sheets

IMAGING SYSTEMS AND METHODS FOR CORRECTING VISUAL ARTIFACTS CAUSED BY CAMERA STRAYLIGHT

TECHNICAL FIELD

The present disclosure relates to imaging systems for correcting visual artifacts during production of extended-reality images for display apparatuses. The present disclosure also relates to methods for correcting visual artifacts during production of extended-reality images for display apparatuses.

BACKGROUND

In recent times, immersive extended-reality (XR) technologies such as virtual-reality (VR), augmented-reality (AR), mixed-reality (MR) are being employed in various fields such as entertainment, real estate, training, medical imaging operations, simulators, navigation, and the like. Such immersive XR technologies create immersive XR environments for presentation to a user of an XR device (such as an XR headset, a pair of XR glasses, or similar).

In order to produce XR images, an XR device employs an imaging system for capturing images of a real-world environment. Existing imaging systems employ camera(s) for capturing images of the real-world environment, and processor(s) for processing the captured images to produce the XR images.

However, existing imaging systems have several problems associated therewith. The existing imaging systems are inefficient in terms of accurately identifying (namely, detecting) and correcting visual artifacts present in the captured images. Such visual artifacts may be flares (such as lens flares, veiling flares, centred flares, and the like), ghosting effects, vignettes, overexposures, underexposures (namely, shadows), fogs, smokes, smudges, hazes, or similar. These visual artifacts produce undesirable visual effects in the XR images (as the captured images having the visual artifacts are used to produce the XR images). In such a case, the XR images produced are sub-optimal and non-immersive. This leads to a poor viewing experience involving lack of realism, lack of immersion, and abstractedness for the user, within the XR environment constituted by such sub-optimal XR images. Artistic effects of such visual artifacts are usually not appreciated (by the user) within the XR environment as such effects serve as a constant and clear indication to the user that he/she is using an XR device. Moreover, as the visual artifacts are caused by camera straylight, it is challenging to avoid production of such visual artifacts. Different cameras have different camera designs and may produce different visual artifacts. For example, visual artifacts are different for a camera having a low height of camera module and another camera having a wide angle camera module.

Therefore, in light of the foregoing discussion, there exists a need to overcome the aforementioned drawbacks associated with the existing imaging systems for producing the XR images.

SUMMARY

The present disclosure seeks to provide an imaging system for correcting visual artifacts during production of extended-reality images for a display apparatus. The present disclosure also seeks to provide a method for correcting visual artifacts during production of extended-reality images for a display apparatus. An aim of the present disclosure is to provide a solution that overcomes at least partially the problems encountered in prior art.

In one aspect, an embodiment of the present disclosure provides an imaging system for correcting visual artifacts during production of extended-reality images for a display apparatus, the imaging system comprising:

at least a first camera and a second camera that are employed to capture contemporaneously a first image and a second image of a real-world environment, respectively; and at least one processor configured to:

analyse the first image and the second image to identify at least one visual artifact present in one of the first image and the second image and determine an image segment of the one of the first image and the second image that corresponds to the at least one visual artifact;

generate image data for the image segment of the one of the first image and the second image, based on at least one of: information pertaining to a virtual object that is to be virtually superimposed over at least a portion of the image segment, at least one other image segment neighbouring the image segment in the one of the first image and the second image, a corresponding image segment in other of the first image and the second image, at least one previous extended-reality image, a photogrammetric model of the real-world environment; and process the one of the first image and the second image, based on the generated image data, to produce a given extended-reality image to be presented at the display apparatus.

In another aspect, an embodiment of the present disclosure provides a method for correcting visual artifacts during production of extended-reality images for a display apparatus, the method comprising:

capturing contemporaneously, via at least a first camera and a second camera, a first image and a second image of a real-world environment, respectively;

analysing the first image and the second image to identify at least one visual artifact present in one of the first image and the second image and determine an image segment of the one of the first image and the second image that corresponds to the at least one visual artifact;

generating image data for the image segment of the one of the first image and the second image, based on at least one of: information pertaining to a virtual object that is to be virtually superimposed over at least a portion of the image segment, at least one other image segment neighbouring the image segment in the one of the first image and the second image, a corresponding image segment of other of the first image and the second image, at least one previous extended-reality image, a photogrammetric model of the real-world environment; and processing the one of the first image and the second image, based on the generated image data, to produce a given extended-reality image to be presented at the display apparatus.

Embodiments of the present disclosure substantially eliminate or at least partially address the aforementioned problems in the prior art, and enable accurate identification of visual artifacts (in captured images) and efficient correction of the visual artifacts, to produce visual artifact-free, highly immersive and realistic extended-reality images for a display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system for correcting visual artifacts during production of extended-reality images for a display apparatus, the imaging system comprising:
  at least a first camera and a second camera that are employed to capture contemporaneously a first image and a second image of a real-world environment, respectively; and
  at least one processor configured to:
    analyse the first image and the second image to identify at least one visual artifact present in one of the first image and the second image and determine an image segment of the one of the first image and the second image that corresponds to the at least one visual artifact;
    generate image data for the image segment of the one of the first image and the second image, based on at least one of: information pertaining to a virtual object that is to be virtually superimposed over at least a portion of the image segment, at least one other image segment neighbouring the image segment in the one of the first image and the second image, a corresponding image segment in other of the first image and the second image, at least one previous extended-reality image, a photogrammetric model of the real-world environment; and
    process the one of the first image and the second image, based on the generated image data, to produce a given extended-reality image to be presented at the display apparatus.

In another aspect, an embodiment of the present disclosure provides a method for correcting visual artifacts during production of extended-reality images for a display apparatus, the method comprising:
  capturing contemporaneously, via at least a first camera and a second camera, a first image and a second image of a real-world environment, respectively;
  analysing the first image and the second image to identify at least one visual artifact present in one of the first image and the second image and determine an image segment of the one of the first image and the second image that corresponds to the at least one visual artifact;
  generating image data for the image segment of the one of the first image and the second image, based on at least one of: information pertaining to a virtual object that is to be virtually superimposed over at least a portion of the image segment, at least one other image segment neighbouring the image segment in the one of the first image and the second image, a corresponding image segment of other of the first image and the second image, at least one previous extended-reality image, a photogrammetric model of the real-world environment; and
  processing the one of the first image and the second image, based on the generated image data, to produce a given extended-reality image to be presented at the display apparatus.

The present disclosure provides the aforementioned imaging system and the aforementioned method for identifying and correcting visual artifacts during production of extended-reality (XR) images for the display apparatus. Herein, the image segment of the one of the first image and the second image that corresponds to the at least one visual artifact is accurately determined and the image data for said image segment is suitably generated to correct the at least one visual artifact. Generating the image data for the image segment and applying the image data to the image segment is performed in real time or near-real time. Moreover, the image data is generated and applied in a manner that upon application of the image data, the image segment corresponding to the at least one visual artifact appears artifact-free, seamlessly integrated with the rest of the given image, and realistic. Resultantly, the given XR image is accurately generated for presentation at the display apparatus (without any latency). Therefore, when a user of the display apparatus views the given XR image, the user experiences realism and immersiveness within an XR environment. The method is fast, effective, reliable and can be implemented with ease.

Moreover, the method is well-suited for correcting different types of visual artifacts that are produced from different cameras having different camera designs.

The term "real-world environment" refers to a physical environment in which the imaging system is present. It will be appreciated that the imaging system produces the given XR image to be presented at the display apparatus in real time or near-real time. Then, the given XR image is communicated from the imaging system to the display apparatus. The given XR image is to be presented to a user of the display apparatus. Herein, the term "extended-reality" encompasses virtual reality (VR), augmented reality (AR), mixed reality (MR), and the like.

Throughout the present disclosure, the term "visual artifact" refers to a visual anomaly that is apparent in a given image upon capturing of the given image. Such visual artifact produces an undesirable visual effect in the given image, and consequently would lead to a poor viewing experience for the user of the display apparatus when the given image is utilized without visual artifact correction to produce the given XR image for the display apparatus. Examples of such visual artifact include, but are not limited to, a flare (such as a lens flare, a veiling flare, a centred flare, and the like), a ghosting effect, a vignette, an overexposure, an underexposure (namely, a shadow), a fog, a smoke, a smudge, a haze. The ghosting effect is a localized visual artifact whose position and appearance in the given image depends on locations of light sources in the real-world environment. The flare is a visual artifact that leads to a decrease of contrast in the given image. The at least one visual artifact is formed as a result of straylight that enters a given camera when the given camera is employed to capture a given image. Different cameras produce different visual artifacts, based on their camera designs. For example, visual artifacts may be different for a camera having a low height of a camera module and another camera having a wide angle camera module.

Throughout the present disclosure, the term "display apparatus" refers to a specialized equipment that is configured to present an XR environment to the user when the display apparatus, in operation, is used by the user. The (visual artifact-free) XR images produced by the imaging system collectively constitute the XR environment. It will be appreciated that the display apparatus is worn by the user on his/her head. The display apparatus is implemented, for example, as an XR headset, a pair of XR glasses, and the like, that is operable to display a visual scene of the XR environment to the user. Commonly, the "display apparatus" may be referred to as "head-mounted display (HMD)", for the sake of convenience only.

In some implementations, the imaging system is integrated with the display apparatus. In such implementations, the imaging system is physically coupled to the display apparatus (for example, attached via mechanical and electrical connections to components of the display apparatus). For example, the first camera and the second camera may be arranged on an outer surface of the display apparatus that faces the real-world environment. Optionally, in such implementations, the at least one processor of the imaging system serves as a processor of the display apparatus. Alternatively, optionally, in such implementations, the at least one processor of the imaging system is communicably coupled to a processor of the display apparatus.

In other implementations, the imaging system is implemented on a remote device that is separate from the display apparatus. In such implementations, the at least one processor of the system and a processor of the display apparatus are communicably coupled, wirelessly and/or in a wired manner. Optionally, the imaging system is mounted on the remote device. Examples of the remote device include, but are not limited to, a drone, a vehicle, and a robot. Optionally, the remote device is physically positioned at the real-world environment, whereas the user of the display apparatus is positioned away from (for example, at a distance from) the remote device.

Optionally, a given camera implemented as at least one visible light camera. Examples of a given visible light camera include, but are not limited to, a Red-Green-Blue-Depth (RGB), a monochrome camera. It will be appreciated that a given camera could be implemented as a combination of the given visible light camera and a depth camera. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. For example, the given camera may be implemented as the stereo camera.

It will be appreciated that first camera and the second camera are very similar to each other in terms of their physical and operative characteristics and/or settings. For example, the first camera and the second camera may comprise same types and/or arrangements of image sensors and optical element(s).

The at least one processor is communicably coupled to the first camera and the second camera wirelessly and/or in a wired manner. The at least one processor is configured to control the operation of the aforementioned imaging system. The at least one processor may be understood to be a compositor (namely, a processing unit that is configured to perform at least compositing tasks pertaining to production of the XR images). The compositor is a software module taking various inputs (such as the captured first and second images, and the image data) and composing (namely, building or generating) the given XR image to be displayed at the display apparatus.

The "first image" and the "second image" of the real-world environment are images captured contemporaneously (namely, at a same time), via the first camera and the second camera, respectively. The at least one processor is configured to control the first camera and the second camera to perform the aforesaid image capturing operations. Optionally, the first image is captured with respect to a perspective of a first eye of the user, while the second image is captured with respect to a perspective of a second eye of the user. In other words, a field of view captured in the first image is offset from a field of view captured in the second image. The first image and the second image represent offset views of the real-world environment, at the same time. Moreover, optionally, a portion of the field of view captured in the first image overlaps with the field of view captured in the second image. In an example, the first eye may be a left eye of the user, while the second eye may be a right eye of the user.

Throughout the present disclosure, the term "image segment" refers to a part of a given image that represents the at least one visual artifact in the given image. The image segment of the one of the first image and the second image that corresponds to the at least one visual artifact comprises at least one pixel. It will be appreciated that the image segment may be a continuous image segment (i.e. all pixels representing the at least one visual artifact are located together in one of the first image and the second image) or a discontinuous image segment (i.e. all pixels representing the at least one visual artifact are located disjointly in one of the first image and the second image). In such a case, it may be understood that the image segment may or may not have a defined shape and/or size.

Optionally, the first camera and the second camera are synchronised in at least one of: exposure time, auto exposure, auto white balance, radiometric calibration, image signal processing. The term "exposure" refers to a characteristic (namely, a property) of the given camera, that encompasses various settings of the given camera for example, such as an exposure time (namely, a shutter speed), a sensitivity (namely, ISO or gain), an aperture, and the like. The term "exposure time" refers to a time span for which a photo-sensitive surface of an image sensor of the given camera is exposed to light so as to capture a given image of the real-world environment. The term "auto exposure" refers to a mode in the given camera, wherein the given camera is controlled (by the at least one processor) to automatically adjust exposure settings according to a given lighting condition of the real-world environment. The term "auto white balance" refers to a mode in the given camera, wherein the given camera is controlled (by the at least one processor) to automatically adjust white balance settings (for example, colour temperature) according to a given lighting condition of the real-world environment. The term "radiometric calibration" refers to calibration of pixel values of pixels in the given image according to amount of light acquired by corresponding pixels on the photo-sensitive surface of an image sensor of the given camera that is employed to capture the given image. It will be appreciated that the radiometric calibration provides a link between raw pixel values obtained by the given camera and calibrated pixel values representing the acquired amount of light. The term "image signal processing" refers to a process of converting a raw form of the given image into a digital form of the given image by performing operations such as de-mosaicing, noise reduction, auto exposure, autofocus, auto white balance, image enhancing, image sharpening, colour conversion, and the like.

It will be appreciated that when the first camera and the second camera are synchronised in the aforementioned parameters, image capturing operations of both the first and second cameras are performed consistently in a manner that the first image and the second image would be similar in terms of at least one of: exposure, white balance, radiometric calibration, image signal processing. In such a case, if there still exists any difference between the first image and the second image despite such synchronism between the first and second cameras, such difference would indicate presence of the at least one visual artifact in one of the first image and the second image. Optionally, the first camera and the second camera are also synchronised in photometric calibration and/or colour calibration.

Optionally, when analysing, the at least one processor is configured to:
divide the first image and the second image into a plurality of first sub-areas and a plurality of second sub-areas, respectively;
detect whether or not a magnitude of a difference between a luminance of a given first sub-area in the first image and a luminance of a corresponding second sub-area in the second image exceeds a first threshold difference; and
when it is detected that the magnitude of said difference exceeds the first threshold difference, determine one of the given first sub-area and the corresponding second sub-area whose luminance is higher than the luminance of other of the given first sub-area and the corresponding second sub-area, and identify the determined one of the given first sub-area and the corresponding second sub-area to have a visual artifact.

Optionally, when dividing a given image into a plurality of given sub-areas, the at least one processor is configured to employ at least one image processing algorithm. Optionally, the at least one image processing algorithm is at least one of: a sliding window algorithm, an image slicing algorithm, an image segmentation algorithm. As an example, the sliding window algorithm may be used to determine sub-area(s) having the visual artifact when a centre pixel of the sub-area(s) has luminance corresponding to the visual artifact.

Optionally, a given sub-area in a given image comprises at least one pixel. In some implementations, the given sub-area comprises a single pixel, whereas in other implementations, the given sub-area comprises a plurality of pixels. It will be appreciated that typically the given sub-area (namely, a given image patch) is of a fixed size, for example, a sub-area of a size 10 pixels*10 pixels. However, the given sub-area could have a dynamic (namely, configurable) size as well. Optionally, the given image is divided into equi-sized sub-areas.

Throughout the present disclosure, the term "luminance" refers to a brightness (namely, an intensity) of a given sub-area in a given image. The luminance of the given sub-area represents achromatic (namely, grayscale or black-and-white) information of the given sub-area. When the given sub-area comprises the single pixel, the luminance of the given sub-area is equal to a luminance value of the single pixel. When the given sub-area comprises the plurality of pixels, the luminance of the given sub-area is estimated from luminance values of the plurality of pixels, for example, as a mean (namely, an average) of luminance values of the plurality of pixels. It will be appreciated that a luminance value of a given pixel of the given sub-area could be expressed using any number of bits, for example, such as 8 bits, 10 bits, 16 bits, and the like. The luminance value of the given pixel of the given sub-area may lie in a range of 0-255, or in a range of 0-1023, 0-65535, and the like.

Optionally, the luminance value of the given pixel of the given sub-area is determined from Red-Green-Blue (RGB) values of the given pixel of the given sub-area. In an example, the luminance value of the given pixel of the given sub-area may be determined as an average of RGB values of the given pixel. Herein, mathematically, the luminance value (I)=(R+G+B)/3, wherein R, G, and B represents red colour value, green colour value, and blue colour value, respectively, of the given pixel. In another example, the luminance value of the given pixel of the given sub-area may be determined mathematically as 0.3*R+0.59*G+0.11*B. The luminance value of the given pixel of the given sub-area may be determined by converting RGB signals or Green-Blue-Green-Red (GBGR) signals to other signals such as Luminance and two colour differences (YUV) signals, Hue-Chroma-Luminance (HCL) signals, Hue-Saturation-Lightness (HSL) signals, Hue-Saturation-Brightness (HSB) signals, Hue-Saturation-Value (HSV) signals, and the like. These other signals have a luminance term that is indicative of luminance values.

A given threshold difference could be defined to have a fixed value, a percentage of a maximum value, or a percentage of the luminance of one of the sub-areas being compared. Optionally, the first threshold difference lies in a range of 5 percent to 25 percent of the luminance of one of the sub-areas being compared. As an example, the first threshold difference may be from 5, 6, 7, 8, 9, 10, 11, 12, 13, 14, 15, 16, 17, 18, 19, 20, 21, 22, 23 or 24 percent up to 6, 7, 8, 9, 10, 11, 12, 13, 14, 15, 16, 17, 18, 19, 20, 21, 22, 23, 24 or 25 percent of the percentage of the luminance of one of the sub-areas being compared.

It will be appreciated that the at least one processor is configured to determine the magnitude of the difference between the luminance of the given first sub-area in the first image and the luminance of the corresponding second sub-area in the second image, and then compare the magnitude of said difference with the first threshold difference to detect whether or not the magnitude of said difference exceeds the first threshold difference. An absolute value of the magnitude of the difference would be utilized when comparing the magnitude of said difference with the first threshold difference. A sign of the difference is not utilized during such comparing. When it is detected that the magnitude of the difference exceeds the first threshold difference, it indicates that the given first sub-area and the corresponding second sub-area have considerable luminance difference, and thus one of them (having higher luminance) has the visual artifact. It will be appreciated that the one of the given first sub-area and the corresponding second sub-area which is determined to have the visual artifact belongs to the image segment corresponding to the at least one visual artifact.

In an example, the luminance of the given first sub-area may be 180, the luminance of the corresponding second sub-area may be 160, 180 being greater than 160, and the first threshold difference may be 8 (calculated as 5 percent of the luminance of the given second sub-area). Herein, the magnitude of the difference between the luminance of the given first sub-area and the luminance of the corresponding second sub-area is 20 (calculated as |180−160|=20) which exceeds the first threshold difference. Therefore, the given first sub-area is identified to have the visual artifact.

Optionally, when it is detected that the magnitude of the difference between the luminance of the given first sub-area in the first image and the luminance of the corresponding second sub-area in the second image does not exceed the first threshold difference, the at least one processor is configured to determine that both of the given first sub-area and the corresponding second sub-area do not have the visual artifact.

Optionally, when analysing, the at least one processor is configured to:
  divide the first image and the second image into a plurality of first sub-areas and a plurality of second sub-areas, respectively;
  detect whether or not a magnitude of a difference between a colour value of a given first sub-area in the first image and a colour value of a corresponding second sub-area in the second image exceeds a threshold colour difference; and
  when it is detected that the magnitude of said difference exceeds the threshold colour difference, determine one of the given first sub-area and the corresponding second sub-area whose colour value is higher than the colour value of other of the given first sub-area and the corresponding second sub-area, and identify the determined one of the given first sub-area and the corresponding second sub-area to have a visual artifact.

In this regard, the "colour value" of a given sub-area refers to a value that is indicative of a colour of the given sub-area. The colour value may be expressed as a single colour value or an additive colour value (i.e. a sum of individual colour values of a plurality of colour components). The colour value may be in form of an 8-bit value, a 16-bit value, a 32-bit value, or similar. In an example, the colour value may be equal to 180 i.e. a single grayscale value. In another example, the colour value may be equal to 496 i.e. a sum of individual colour values '64', '224' and '208' of red, green, and blue colour components.

Optionally, the at least one processor is configured to determine the difference between the colour value of the given first sub-area in the first image and the colour value of the corresponding second sub-area in the second image by employing at least one of: a CIELab-based colour difference formula, a CIEDE2000-based colour difference formula. Optionally, the threshold colour difference lies in a range of 1 to 10. As an example, the threshold colour difference may be from 1, 1.5, 2, 2.5, 3, 3.5 4, 4.5, 5, 5.5, 6, 6.5, 7, 7.5, 8, 8.5, 9 or 9.5 up to 1.5, 2, 2.5, 3, 3.5 4, 4.5, 5, 5.5, 6, 6.5, 7, 7.5, 8, 8.5, 9, 9.5 or 10. Such a threshold colour difference is detected by a human visual system. When it is detected that the magnitude of the difference exceeds the threshold colour difference, it indicates that the given first sub-area and the corresponding second sub-area have considerable colour difference, and thus one of them (having higher colour value) has the visual artifact. It will be appreciated that the determined one of the given first sub-area and the corresponding second sub-area having the visual artifact belongs to the image segment corresponding to the at least one visual artifact.

In an example, the colour value of the given first sub-area may be 230, the colour value of the corresponding second sub-area may be 232, 232 being greater than 230, and the threshold colour difference may be 1. Herein, the magnitude of the difference between the colour value of the given first sub-area and the colour value of the corresponding second sub-area is 2, which exceeds the threshold colour difference. Therefore, the corresponding second sub-area is identified to have the visual artifact.

Optionally, when it is detected that the magnitude of the difference between the colour value of the given first sub-area in the first image and the colour value of the corresponding second sub-area in the second image does not exceed the threshold colour difference, the at least one processor is configured to determine that neither of the given first sub-area and the corresponding second sub-area have the visual artifact.

Optionally, when analysing, the at least one processor is configured to:
  divide a given image into a plurality of sub-areas;
  detect whether or not a magnitude of a difference between a luminance of a given sub-area in the given image and a luminance of at least one other sub-area neighbouring the given sub-area exceeds a second threshold difference; and
  when it is detected that the magnitude of said difference exceeds the second threshold difference, determine one of the given sub-area and the at least one other sub-area whose luminance is higher than the luminance of other of the given sub-area and the at least one other sub-area, and identify the determined one of the given sub-area and the at least one other sub-area to have a visual artifact.

Optionally, the second threshold difference lies in a range of 5 percent to 25 percent of the luminance of one of the sub-areas being compared. As an example, the first threshold difference may be from 5, 6, 7, 8, 9, 10, 11, 12, 13, 14, 15, 16, 17, 18, 19, 20, 21, 22, 23 or 24 percent up to 6, 7, 8, 9, 10, 11, 12, 13, 14, 15, 16, 17, 18, 19, 20, 21, 22, 23, 24 or 25 percent of the percentage of the luminance of one of the sub-areas being compared. The second threshold difference may optionally be different from the first threshold difference.

It will be appreciated that the at least one processor is configured to determine the magnitude of the difference between the luminance of the given sub-area and the luminance of the at least one other sub-area, and then compare the magnitude of said difference with the second threshold difference to detect whether or not the magnitude of said difference exceeds the second threshold difference. An absolute value of the magnitude of said difference would be utilized when comparing the magnitude of the difference with the second threshold difference. A sign of the difference is not utilized during such comparing. When it is detected that the magnitude of the difference exceeds the second threshold difference, it indicates that the given sub-area and the at least one other sub-area have considerable luminance difference, and thus one of them (having higher luminance) has the visual artifact. It will be appreciated that the determined one of the given sub-area and the at least one other sub-area having the visual artifact belongs to the image segment corresponding to the at least one visual artifact.

In an example, the luminance of the given sub-area in the first image may be 100, the luminance of the other sub-area neighbouring the given sub-area in the first image may be 110, 110 being greater than 100, and the second threshold difference may be 6 (calculated as 6 percent of the luminance of the given sub-area in the first image). Herein, the magnitude of the difference between the luminance of the given sub-area and the luminance of the other sub-area neighbouring the given sub-area is 10 (calculated as |100−110|=10) which exceeds the second threshold difference. Therefore, the other sub-area neighbouring the given sub-area is identified to have the visual artifact.

Optionally, when it is detected that the magnitude of the difference between the luminance of the given sub-area in the given image and the luminance of the other sub-area neighbouring the given sub-area in the given image does not exceed the second threshold difference, the at least one processor is configured to determine that both of the given sub-area and the other sub-area neighbouring the given sub-area do not have the visual artifact.

Optionally, the at least one processor is configured to analyse the first image and the second image to identify the at least one visual artifact, based on information pertaining to at least one light source present in the real-world environment, said information comprising at least one of: a location of the at least one light source in the real-world environment, a direction in which light emanating from the at least one light source is directed within the real-world environment, an intensity of the light emanating from the at least one light source, a wavelength of the light emanating from the at least one light source, a shape of the at least one light source.

Optionally, the at least one light source is at least one natural light source and/or at least one artificial light source. The at least one natural light source can be the Sun, a star, a firefly, and the like. The at least one artificial light source can be a lamp, a display, a candle, and the like. Formation of the at least one artifact in a given image depends on at least one of the aforesaid factors constituting the information pertaining to at least one light source present in the real-world environment. Such factors affect an amount of stray light that enters a given camera and a manner in which such stray light forms visual artifact(s) in the given image. In such a case, characteristics (such as a shape, a size, an intensity, and the like) of such visual artifact(s) would be consistent and does not change over time for the information pertaining to at least one light source.

Optionally, the at least one processor is configured to create a visual artifact database comprising expected visual artifact(s) to be formed based on the information pertaining to at least one light source present in the real-world environment. Such a visual artifact database may be created by capturing a plurality of images of the real-world environment where said at least one light source is present, wherein the expected visual artifact(s) are represented in the plurality of images. Optionally, when analysing the first image and the second image to identify the at least one visual artifact, the at least one processor is configured to utilize the visual artifact database. In such a case, the at least one processor is configured to determine whether or not the at least one visual artifact matches with a corresponding expected visual artifact in the visual artifact database. When the at least one visual artifact matches with the corresponding expected visual artifact, an image segment of the one of the first image and the second image that corresponds to the at least one visual artifact is determined. The visual artifact database may be created by employing an experimental setup or a simulation setup, wherein the expected visual artifact(s) is/are determined prior to a start of an XR session. The at least one light source may be modelled to have a shape in form of a bar or a rod or a collection of dots, in the visual artifact database.

Optionally, the at least one processor is configured to create the visual artifact database by estimating modulation transfer function (MTF) and the information pertaining to the at least one light source present in the real-world environment. The MTF may be estimated using an edge-gradient analysis, for example, a slanted-edge analysis. The visual artifacts may be modelled using long tails of a point spread function (PSF) that is estimated by the slanted-edge analysis. Creation of the visual artifact database is well-known in the art.

Optionally, the at least one processor is configured to create the information pertaining to the at least one light source present in the real-world environment by means of at least one of: a three-dimensional (3D) data modelling technique, a simultaneous localization and mapping (SLAM) technique.

Optionally, when analysing the given image, the at least one processor is configured to employ a learning model that is trained based on optical properties of a lens of a given camera. Additionally, optionally, the at least one processor is further configured to employ the learning model that is trained based on mechanical tilting, rotating and/or shifting of the lens. It will be appreciated that typically the at least one visual artifact has definite (namely, constant) characteristics for given optical properties of the lens of the given camera.

Optionally, a given image is captured using a default exposure setting of a given camera, and wherein the given camera is to be employed to capture at least one underexposed image using an adjusted exposure setting of the given camera, wherein, when analysing, the at least one processor is configured to:
  divide the given image and the at least one underexposed image into a plurality of sub-areas and a plurality of underexposed sub-areas, respectively;
  detect whether or not a magnitude of a difference between a luminance of a given sub-area in the given image and a luminance of a corresponding underexposed sub-area in the at least one underexposed image exceeds a third threshold difference; and when it is detected that the magnitude of said difference exceeds the third threshold difference, identify the given sub-area of the given image to have a visual artifact.

Optionally, when dividing the at least one underexposed image into the plurality of underexposed sub-areas, the at least one processor is configured to employ the at least one image processing algorithm.

It will be appreciated that the default exposure setting of the given camera is such that the exposure time of the given camera is high, and the given image would have the at least one visual artifact. It will also be appreciated that the adjusted exposure setting of the given camera is such that the exposure time of the given camera is lower than that of the default exposure setting and the at least one underexposed image would not have the at least one visual artifact. Preferably, the given image and the at least one underexposed image are captured from a same pose of the given camera. The term "pose" encompasses both a position and an orientation.

Optionally, the third threshold difference lies in a range of 0 units to 30 units from a digital number representing one of the luminance of the given sub-area and the luminance of the corresponding underexposed sub-area. For example, the third threshold difference may be from 0, 5, 10, 15, 20 or 25 units up to 5, 10, 15, 20, 25 or 30 units from the digital number representing one of the luminance of the given sub-area and the luminance of the corresponding underexposed sub-area. The aforesaid range of the third threshold difference is defined in terms of the digital number whose values lie in a range of 0-255. In such a case, the aforesaid range of the third threshold difference may be scaled accordingly, when values of the digital lie in another range such as a range of 0-1023, a range of 0-65535, or similar. It will be appreciated that the third threshold difference could be expressed in terms of units of a digital number, units of least significant bit, or similar.

Alternatively, optionally, the third threshold difference lies in a range of 0 percent to 20 percent of one of the luminance of the given sub-area and the luminance of the corresponding underexposed sub-area. For example, the third threshold difference may be from 0, 1, 2, 3, 4, 5, 6, 7, 8, 9, 10, 11, 12, 13, 14, 15, 16, 17, 18 or 19 percent up to 1, 2, 3, 4, 5, 6, 7, 8, 9, 10, 11, 12, 13, 14, 15, 16, 17, 18, 19 or 20 percent of one of the luminance of the given sub-area and the luminance of the corresponding underexposed sub-area.

It will be appreciated that the at least one processor is configured to determine the magnitude of the difference between the luminance of the given sub-area and the luminance of the corresponding underexposed sub-area, and then compare the magnitude of said difference with the third threshold difference to detect whether or not the magnitude of said difference exceeds the third threshold difference. An absolute value of the magnitude of said difference would be utilized when comparing the magnitude of the difference with the third threshold difference. A sign of the difference is not utilized during such comparing. When it is detected that the magnitude of said difference exceeds the third threshold difference, it indicates that the given sub-area in the given image has considerable luminance difference between the given image and the at least one underexposed image, and thus the given sub-area in the given image has the visual artifact. It will be appreciated that the given sub-area having the visual artifact belongs to the image segment corresponding to the at least one visual artifact.

In an example, the luminance of the given sub-area in the second image may be 150, the luminance of the corresponding underexposed sub-area in the at least one underexposed image may be 90, 150 being greater than 90, and the third threshold difference may be 30 (calculated as 20 percent of the luminance of the given sub-area in the second image). Herein, the magnitude of the difference between the luminance of the given sub-area and the luminance of the corresponding underexposed sub-area is 60 (calculated as |150−90|=60) which exceeds the third threshold difference. Therefore, the given sub-area in the second image is identified to have the visual artifact.

Optionally, when it is detected that the magnitude of the difference between the luminance of the given sub-area in the given image and the luminance of the corresponding sub-area in the at least one underexposed image does not exceed the third threshold difference, the at least one processor is configured to determine that the given sub-area in the given image does not have the visual artifact.

Optionally, when analysing, the at least one processor is configured to determine a shape of the at least one visual artifact based on a shape of an aperture of a given camera. Typically, the at least one visual artifact originates from a centre of the at least one light source present in the real-world environment. For a non-circular shape of the aperture of the given camera, the shape of the at least one visual artifact depends on a number of sides (namely, edges) of the non-circular shape of the aperture of the given camera. The at least one visual artifact appears as multiple bright streaks of light originating or radiating outwards from the centre of the at least one light source. Such visual artifact is produced by a diffraction phenomenon that usually occurs at an edge of the aperture of the given camera. Generally, when a number of sides of the non-circular shape of the aperture is an even number, the at least one visual artifact has a same (even) number of bright streaks of light; whereas when a number of sides of the non-circular shape of the aperture is an odd number, the at least one visual artifact has a number of bright streaks of light that is equal to twice the (odd) number of sides. In an example, when the number of sides of the non-circular shape of the aperture are 4 (i.e. even), the at least one visual artifact may have 2 flares (each flare having 2 bright streaks of light) and these 2 flares are mutually perpendicular to each other. In another example, when the number of sides of the non-circular shape of the aperture are 5 (i.e. odd), the at least one visual artifact may have 10 bright streaks of light in shape of a star. Moreover, for a circular shape of the aperture, a visual artifact known as a halo effect (namely, a halo flare) is produced as a loop around the at least one light source. The shape of the halo effect can be circular, semi-circular, or similar. The halo effect fades out light from the centre of the at least one light source, and is produced due to an intense scattering of the light at the aperture (of the circular shape). Such exemplary scenarios have been illustrated in conjunction with FIGS. 4A, 4B, 4C, 4D, and 4E, as described below.

Optionally, the at least one processor is further configured to determine a threshold size of a given visual artifact, based on an image content represented in the first image and/or the second image of the real-world environment. The image content may represent objects (for example, such as stars in a night sky) whose features appear similar to visual artifacts, but these features should not be identified as visual artifacts, nor be corrected using the image data. Therefore, the at least one processor is optionally configured to identify a given feature of the image content represented in a given image as a visual artifact when a size of the given feature is greater than the threshold size of the given visual artifact. For example, the first image may represent the stars in the night sky. Herein, the at least one processor do not identify the stars in the night sky as visual artifacts, and thus the stars are not removed. The threshold size of the given visual artifact could be defined as a percentage of a size of a given object represented in a given image. Optionally, the threshold size of the given visual artifact lies in a range of 100 percent to 125 percent of the size of the given object represented in the given image.

Optionally, the at least one processor is further configured to determine the threshold size of the given visual artifact, based also on an image size of the first image and/or the second image of the real-world environment. Optionally, the threshold size of the given visual artifact lies in a range of 5 percent to 30 percent of the image size of the first image and/or the second image of the real-world environment. As an example, the threshold size of the given visual artifact may be from 5, 7, 9, 11, 13, 15, 17, 19, 21, 23, 25, 27 or 29 percent up to 7, 9, 11, 13, 15, 17, 19, 21, 23, 25, 27, 29 or 30 percent of the image size of the first image and/or the second image of the real-world environment. The image size may be expressed in terms of a total number of pixels.

Optionally, the imaging system further comprises pose-tracking means, a given camera being employed to capture a plurality of consecutive images, wherein the at least one processor is configured to:
- process pose-tracking data, collected by the pose-tracking means, to track a pose of the given camera;
- determine a first motion vector representing a movement of the given camera, based on the tracked pose of the given camera;
- determine a second motion vector representing a change in a position of a given visual artifact across the plurality of consecutive images;
- detect whether or not an angle between the first motion vector and the second motion vector exceeds a threshold angle; and
- when it is detected that the angle between the first motion vector and the second motion vector exceeds the threshold angle, discard the given visual artifact.

Herein, the term "pose-tracking means" refers to specialized equipment that is employed to detect and/or follow the pose of the given camera. In practice, the pose-tracking means is actually optionally employed to track a pose of the display apparatus that is worn by the user on his/her head, when the given camera is mounted on the display apparatus. Thus, the pose of the given camera changes according to changes in a pose of the display apparatus. Pursuant to embodiments of the present disclosure, the pose-tracking means is implemented as a true six Degrees of Freedom (6DoF) tracking system. In other words, the pose-tracking means tracks both the position and the orientation of the given camera within a 3D space of the real-world environment. In particular, said pose-tracking means is configured to track translational movements (namely, surge, heave and sway movements) and rotational movements (namely, roll, pitch and yaw movements) of the given camera within the 3D space.

The pose-tracking means could be implemented as an internal component of the imaging system, as a tracking system external to the imaging system, or as a combination thereof. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be implemented as an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader.

Optionally, the at least one processor employs at least one data processing algorithm to process the pose-tracking data. The pose-tracking data may be in form of images, IMU/TIMU values, motion sensor data values, magnetic field strength values, or similar. Correspondingly, requisite data processing algorithm(s) is/are employed to process the pose-tracking data, to track the pose of the given camera. Examples of the at least one data processing algorithm include a feature detection algorithm, an environment mapping algorithm, a pose data extrapolation algorithm, and the like.

The term "motion vector" encompasses both a magnitude and a direction of movement (namely, motion) of a given object. The given object could be a physical object (for example, such as the given camera) or a visual object (for example, the given visual artifact) represented in an image. The magnitude of a given motion vector is a magnitude of an offset (namely, a distance) between an initial position and a subsequent position of the given object, while the direction of the given motion vector may be a direction extending from the initial position towards the subsequent position of the given object. Optionally, when determining a given motion vector, the at least one processor is configured to employ at least one motion vector estimation algorithm. Optionally, the at least one motion vector estimation algorithm is at least of: an optical flow algorithm, a pixel-matching algorithm, a block-matching algorithm, a phase correlation algorithm, a pixel recursive algorithm. Such motion vector estimation algorithms are well known in the art.

Optionally, the first motion vector is determined using a current pose and at least one previous pose of the given camera. In an example, the first motion vector may represent the movement of the given camera from a left region of the real-world environment to a right region of the real-world environment. Optionally, the change in the position of the given visual artifact is indicated by a change in position of a given sub-area having a luminance corresponding to the given visual artifact, across the plurality of consecutive images. Optionally, the at least one processor is configured to: process the plurality of consecutive images to determine in each image, the position of the given sub-area; and determine the second motion vector using a plurality of positions of the given sub-area across the plurality of consecutive images. In an example, the second motion vector may represent the change in the position of the given visual artifact from a central sub-region to a sub-region on a left side.

Optionally, the threshold angle is measured in terms of degrees or radian. Optionally, the threshold angle lies in a range of 0 degree to 89 degrees. In this regard, the threshold angle is an acute angle. More optionally, the threshold angle lies in a range of 0 degrees to 45 degrees. Yet more optionally, the threshold angle lies in a range of 0 degrees to 30 degrees. As an example, the threshold angle may be from 0, 5, 10, 15, 20, 25, 30, 35, 40, 45, 50, 55, 60, 65, 70, 75, 80 or 85 degrees up to 5, 10, 15, 20, 25, 30, 35, 40, 45, 50, 55, 60, 65, 70, 75, 80, 85 or 89 degrees.

The at least one processor optionally compares the angle between the first motion vector and the second motion vector with the threshold angle to detect whether or not the angle between the first motion vector and the second motion vector exceeds the threshold angle. When it is detected that the angle between the first motion vector and the second motion vector exceeds the threshold angle, it indicates that the given visual artifact is caused by a moving object (such as a highly reflective moving object) in the real-world environment, and thus the given visual artifact is not required to be corrected.

Optionally, the at least one processor is configured to:
 detect whether or not a shape of the given visual artifact changes across the plurality of consecutive images; and
 when it is detected that the angle between the first motion vector and the second motion vector does not exceed the threshold angle, but the shape of the given visual artifact changes across the plurality of consecutive images, discard the given visual artifact.

When it is detected that the angle between the first motion vector and the second motion vector does not exceed the threshold angle (for example, when the first motion vector and the second motion vector may be consistent with each other i.e. the movement of the given camera may be exactly consistent with the change of position of the given visual artifact), it indicates that the given visual artifact should not be discarded. Furthermore, in such a case, the shape and the position of the given visual artifact would be constant across the plurality of consecutive images. However, when the first and second motion vectors are consistent with each other but there is a change of the shape of the given visual artifact across the plurality of consecutive images, it indicates that the given visual artifact is caused by the moving object in the real-world environment and is not caused due to the lens of the given camera. This is because the shape of the given visual artifact would not change across the plurality of consecutive images due to the lens of the given camera (not even when the pose of the given camera changes) as the optical properties of the lens of the given camera are fixed. Visual artifacts caused by moving objects in the real-world environment can be in any shape or form, and can be discarded (i.e. not corrected) for purposes of correction. Optionally, the at least one processor is configured to process the plurality of consecutive images to determine the shape of the given visual artifact. In this regard, the shape of the given visual artifact would correspond to a shape of a given sub-area in the plurality of consecutive images, having a luminance similar to that of the given visual artifact.

Optionally, when it is detected that the angle between the first motion vector and the second motion vector does not exceed the threshold angle and the shape of the given visual artifact does not change across the plurality of consecutive images, the given visual artifact is not discarded and the at least one sub-area (in the plurality of consecutive images) is identified to have said given visual artifact. In such a case, the given visual artifact is required to be corrected using the image data.

Optionally, the at least one processor is configured to:
 access, from a data repository, a lighting model of the real-world environment;
 detect whether or not a magnitude of a difference between a luminance of the first image and a luminance of the second image exceeds a fourth threshold difference; and
 when it is detected that the magnitude of said difference exceeds the fourth threshold difference, determine, based on the lighting model of the real-world environment, if any of the first camera and the second camera has moisture or dirt.

Herein, the term "lighting model" refers to a data structure that models lighting conditions in the real-world environment. Optionally, the lighting model comprises a plurality of images of the real-world environment with corresponding expected luminance of the plurality of images. Optionally, the at least one processor is configured to generate the lighting model based on the information pertaining to the at least one light source present in the real-world environment. Optionally, the at least one processor is configured to generate the lighting model of the real-world environment prior to start of an XR session. It will be appreciated that the at least one processor is communicably coupled to the data repository wirelessly, or in wired manner. Herein, the term "data repository" refers to hardware, software, firmware, or a combination of these for storing the lighting model of the real-world environment, in an organized (namely, structured) manner, thereby, allowing for easy storage, access (namely, retrieval), and updating of the lighting model. It will be appreciated that the data repository could be implemented as a memory of the imaging system, a memory of the display apparatus, a memory of a computer coupled to the display apparatus, a cloud-based memory, or similar. Moreover, other ways of generating the lighting model of the real-world environment are also possible.

Optionally, the fourth threshold difference lies in a range of 0 percent to 20 percent of one of luminance of the first image and luminance of the second image. For example, the fourth threshold difference may be from 0, 1, 2, 3, 4, 5, 6, 7, 8, 9, 10, 11, 12, 13, 14, 15, 16, 17, 18 or 19 percent up to 1, 2, 3, 4, 5, 6, 7, 8, 9, 10, 11, 12, 13, 14, 15, 16, 17, 18, 19 or 20 percent of one of the luminance of the first image and the luminance of the second image.

It will be appreciated that the at least one processor is optionally configured to determine the magnitude of the difference between the luminance of the first image and the luminance of the second image, and then compare the magnitude of said difference with the fourth threshold difference to detect whether or not the magnitude of said difference exceeds the fourth threshold difference. An absolute value of the magnitude of said difference would be utilized when comparing the magnitude of the difference with the fourth threshold difference. A sign of said difference is not utilized during such comparing.

When it is detected that the magnitude of the difference exceeds the fourth threshold difference, it indicates that the luminance of any of the first image or the second image is inconsistent with expected luminance according to the lighting model. Therefore, optionally, the luminance of the first image and the luminance of the second image are compared with expected luminance of corresponding images in the lighting model. When the luminance of the first image and/or the luminance of the second image is greater than 120 percent of the expected luminance of its corresponding image, it is determined that the first camera and/or the second camera, respectively, has moisture. Owing to the moisture, the at least one visual artifact (such as the haze or a scattered flare) is produced in the first image and/or the second image, thereby causing an unexpected increase of luminance in the first image and/or the second image. When the luminance of the first image and/or the luminance of the second image is lesser than 80 percent of the expected luminance of its corresponding image, it is determined that the first camera and/or the second camera, respectively, has dirt. Owing to the dirt, the at least one visual artifact (such as a black spot due to dust or grease) is produced in the first image and/or the second image, thereby causing an unexpected decrease of luminance in the first image and/or the second image. It will be appreciated that the aforesaid criteria for determining the moisture and/or the dirt remain unchanged even when the pose of a given camera (or the pose of the display apparatus) changes for capturing subsequent given images.

Throughout the present disclosure, the term "image data" refers to data pertaining to visual information for the image segment of the given image in which the at least one visual artifact is identified to be present. The image data is not generated for an image that does not include any visual artifact. The image data encompasses not only colour information to be represented in the image segment of the given image, but also other attributes associated with the image segment of the given image (for example, such as depth information, transparency information, luminance information and the like).

Optionally, the image data for the image segment of the given image comprises at least one of: pixel values of pixels of the image segment, depth values of pixels of the image segment, transparency values of pixels of the image segment. A given pixel value of a given pixel is indicative of a luminance and a colour of the given pixel. Notably, the image data for the image segment of the given image is required to be generated by the at least one processor when said image segment corresponds to the at least one visual artifact, as the at least one visual artifact is required to be corrected using the image data. Optionally, the at least one processor configured to generate the image data for the image segment of a given image in a manner that the at least one visual artifact is corrected (namely, eliminated or reconstructed) upon utilizing the generated image data for processing the given image.

Optionally, when generating the image data for the image segment of the given image, the at least one processor is configured to employ at least one inpainting algorithm. Optionally, the at least one inpainting algorithm is at least one of: a Rapid Frequency Selective Reconstruction (FSR) algorithm, a Fast Marching Method (FMM) algorithm, a Navier Stokes (NS) based inpainting algorithm, a coherence transport based inpainting algorithm, an exemplar-based inpainting algorithm, Criminisi's algorithm, a group-based sparse representation (GSR) algorithm, a compression-oriented edge-based inpainting algorithm, an annihilating filter-based low-rank Hankel matrix approach (ALOHA) algorithm, an image melding using patch-based synthesis algorithm.

Additionally or alternatively, optionally, when generating the image data for the image segment of the given image, the at least one processor is configured to employ at least one of: a homomorphic filtering technique, a histogram equalization technique, to adjust luminance of the image segment of the given image. It will be appreciated that optionally the homomorphic filtering and histogram equalization techniques are used to generate the image data for the image segment of the given image when the at least one visual artifact is at least one of: a smoke, a fog, a smudge, a haze. The homomorphic filtering and histogram equalization techniques are well-known in the art.

It will be appreciated that the at least one processor is optionally configured to determine whether to use the at least one inpainting algorithm or the homomorphic filtering technique or the histogram equalization technique for generating the image data, based on a predefined threshold. As described earlier, the homomorphic filtering technique or the histogram equalization technique can be used in case of at least one of:
  a visual artifact has a known flare shape;
  a visual artifact covers a large area with no luminance or colour difference gradient; and
  a visual artifact covers a large area with closely linear luminance or colour difference gradient.

Next, there will now be described various basis on which the image data for the image segment of the given image is generated.

Optionally, when generating the image data for the image segment of the one of the first image and the second image, the at least one processor is configured to utilize the information pertaining to the virtual object that is to be virtually superimposed over at least a portion of the image segment. Herein, the term "virtual object" refers to a computer-generated object. Examples of the virtual object may include, but are not limited to, a virtual navigation tool (such as a virtual map, a virtual direction signage, and so forth), a virtual gadget (such as a virtual calculator, a virtual computer, and so forth), a virtual message (such as a virtual instant message, a virtual chat conversation, a virtual to-do note, and so forth), a virtual entity (such as a virtual person, a virtual animal, a virtual ghost, and so forth), a virtual entertainment media (such as a virtual painting, a virtual video, a virtual interactive advertisement, and so forth), and a virtual information (such as a virtual news description, a virtual announcement, virtual data, and so forth).

Optionally, the information pertaining to the virtual object comprises at least one of: a plurality of pixel values of pixels corresponding to the virtual object, a plurality of depth values of pixels corresponding to the virtual object, a plurality of transparency values of pixels corresponding to the virtual object, a shape of the virtual object, a size of the virtual object, a motion of the virtual object. Optionally, pixel values for at least some pixels corresponding to the image segment of the one of the first image and the second image are generated to be same as pixel values of pixels corresponding to the virtual object. Optionally, the virtual object is to be fully superimposed over the image segment of the one of the first image and the second image. In such a case, pixel values for all pixels corresponding to the image segment are generated to be same as pixel values of pixels corresponding to the virtual object. Alternatively, optionally, the virtual object is to be partially superimposed over the image segment of the one of the first image and the second image. In such a case, pixel values for some pixels corresponding to the image segment are generated to be same as pixel values of some pixels corresponding to the virtual object. Herein, the pixel values for other pixels corresponding to the image segment are either estimated based on the (available) pixel values of pixels corresponding to the virtual object or are estimated based on other basis of generation of the image data.

In an example, the virtual object may be a virtual painting that is to be virtually superimposed fully over the image segment of the first image, wherein said image segment corresponds to the at least one visual artifact. Herein, pixel values of all pixels corresponding to the virtual painting may be '496', and such pixels would have a 'turquoise' colour and 65.9 percent luminance (according to a scale where black colour has 0 percent luminance and white colour has 100 percent luminance). In such a case, pixel values for all pixels corresponding to the image segment of the first image may be equal to '496'.

Optionally, when generating the image data for the image segment of the one of the first image and the second image, the at least one processor is configured to utilize the at least one other image segment neighbouring the image segment in the one of the first image and the second image. Optionally, in this regard, the image data for the image segment is generated based on image data of the at least one other image segment neighbouring the image segment in the one of the first image and the second image. It will be appreciated that the image data of the at least one other image segment is already accurately known to the at least one processor, as it is captured in the one of the first image and the second image. As an example, the pixel values of pixels corresponding to the image segment are estimated from pixel values of pixels corresponding the at least one other image segment. It will be appreciated that when the pixel values of pixels corresponding the at least one other image segment in the one of the first image and the second image are used for generating the image data, the image segment of the one of the first image and the second image appears seamless and continuous with said at least one other image segment.

In an example, there may be represented a green tree in the at least one other image segment neighbouring the image segment in the one of the first image and the second image. In such a case, pixel values of pixels are estimated from pixel values of pixels corresponding to the green tree in the at least one other image segment.

Optionally, when generating the image data for the image segment of the one of the first image and the second image, the at least one processor is configured to utilize the corresponding image segment in the other of the first image and the second image. Optionally, in this regard, the image data for the image segment of the one of the first image and the second image is generated based on image data of the corresponding image segment in the other of the first image and the second image. In such a case, the at least one processor is configured to re-project (namely, warp) the generated image data for the image segment, based on a viewpoint and a view direction of a camera that is used to capture the other of the first image and the second image and a viewpoint and a view direction of a camera that is used to capture the one of the first image and the second image. Such a process of generating the image data for the image segment may also be referred to as fusion of the first and second images. It will be appreciated that the image data of the corresponding image segment in the other of the first image and the second image is already accurately known to the at least one processor, as said image data is captured whilst imaging the other of the first image and the second image.

In an example, when generating the image data for the image segment of the first image, the corresponding image segment of the second image may be cropped from the second image and then re-projected according a change in viewpoint and view direction of the first camera and the second camera.

Optionally, when generating the image data for the image segment of the one of the first image and the second image, the at least one processor is configured utilize the at least one previous XR image. Optionally, in this regard, the image data for the image segment of the one of the first image and the second image is generated based on image data of the at least one previous XR image. It will be appreciated that the image data of the at least one previous XR image is already accurately available with the at least one processor, as the at least one previous XR image was previously produced by the at least one processor. In an example, pixel values for pixels corresponding to the image segment of the one of the first image and the second image may be estimated to be same as pixel values of pixels corresponding to a corresponding region in the at least one previous XR image. In generating the image data this way, the image segment of the one of the first image and the second image would be consistent with the corresponding region of the at least one previous XR image. Optionally, the at least one previous XR image had been produced in a recent time period preceding the production of the given XR image. Optionally, the recent time period lies in a range of 0.001 milliseconds (or 1 microsecond) to 1000 milliseconds (or 1 second).

It will be appreciated that when generating the image data, utilizing the at least one previous XR image provides accurate image data for static objects in the real-world environment. As a frame rate of generating XR images is generally high (such as greater than 60 frames per second, 90 frames per second, or similar), there is a high likelihood that visual information pertaining to the at least one previous XR image would be relevant to the given image (namely, the first image and/or the second image). Therefore, the at least one previous XR image can be effectively utilized for generating the image data of the image segment of the one of the first image and the second image.

Optionally, when generating the image data for the image segment of the one of the first image and the second image, the at least one processor is configured to utilize the photogrammetric model of the real-world environment. The photogrammetric model provides a realistic estimation of the image data for the image segment of the one of the first image and the second image, based on information pertaining to the real-world environment. In an example, pixel values of the pixels corresponding to the image segment of the one of the first image and the second image are estimated from pixel values of the pixels corresponding to a same region represented in the photogrammetric model of the real-world environment.

Herein, the term "photogrammetric model" refers to a data structure representative of a given real-world environment in which the display apparatus is to be used. In order to generate the photogrammetric model of the real-world environment, multiple images of the real-world environment are captured and analyzed to obtain the information pertaining to the real-world environment. Optionally, the first camera and the second camera are configured to capture the images of the real-world environment that are used for generating the photogrammetric model of the real-world environment. Optionally, the at least one processor is configured to generate the photogrammetric model of the real-world environment. Optionally, the at least one processor is configured to generate the photogrammetric model of the real-world environment prior to, or at a start of an XR session.

Optionally, the photogrammetric model of the real-world environment comprises the information pertaining to the real-world environment, said information being indicative of at least one of: optical depth(s) of object(s) within the real-world environment with respect to the first camera and/or second camera, feature(s) of the object(s) detected from the captured images of the real-world environment, physical shape(s) and size(s) of object(s) that is/are determined based on processing the optical depth(s) and the feature(s) of the object(s), material properties of the object(s) or portions of the object(s), information regarding lights and lighting conditions (such as luminance, darkness, shadowing, and the like) within the real-world environment.

In an embodiment, the photogrammetric model of the real-world environment is not updated during the XR session. In another embodiment the photogrammetric model of the real-world environment is dynamically updated during the XR session. Optionally, the at least one processor is further configured to dynamically update the photogrammetric model of the real-world environment based on the captured first image, second image, and/or XR images produced during the XR session. Optionally, the at least one processor is configured to periodically update or to intermittently update the photogrammetric model of the real-world environment. For example, the photogrammetric model of the real-world environment may be periodically updated after every 10 minutes or may be intermittently updated after 10 minutes, and then again updated after 30 minutes. Alternatively, optionally, the at least one processor is configured to update the photogrammetric model of the real-world environment based on user-input.

Optionally, when processing the one of the first image and the second image to produce the given XR image, the at least one processor is configured to apply the image data generated for the image segment of the one of the first image and the second image to the image segment of the one of the first image and the second image. Upon such applying of the image data for the image segment of the one of the first image and the second image, the at least one visual artifact present in one of the first image and the second image is corrected. In such a case, the given XR image so produced is free from the at least one visual artifact and appears immersive and realistic. As a result, when the given XR image is rendered at the at display apparatus and is viewed by the user of the display apparatus, the user experiences realism and immersiveness within the XR environment.

Optionally, when processing the one of the first image and the second image, the at least one processor is configured to perform inpainting of the image segment of the one of the first image and the second image according to the generated image data, to produce the given XR image. The image segment is inpainted with the generated image data. Inpainting operation is well-known in the art. Optionally, when processing the one of the first image and the second image, the at least one processor is configured to digitally superimpose the virtual object over at least a portion of the image segment of the one of the first image and the second image, to produce the given XR image. Also, for any given shape of the aperture of the given camera, a given visual artifact may have wide, sparse and long streaks of light in the given image that is captured by the given camera. If the same given visual artifact were to be perceived by an eye of the user, these streaks of light would be narrower, denser and shorter than in the given image. In such a case, the at least one processor is optionally configured to replace the very bright and long streaks of light with narrow, shorter, and dense streaks of light to emulate a manner in which the given visual artifact is perceived by the eye of the user. The at least one processor may be configured to replace the very bright and long streaks of light according to a f-number (such as a f-number f/8.3) of the eye of the user for said emulation.

Optionally, the processor of the display apparatus is configured to display the given XR image via at least one display or projector. In this regard, the display apparatus comprises the at least one display or projector. Examples of a given display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, the given XR image is projected onto a projection screen or directly onto a retina of the user's eyes. Examples of a given projector include, but are not limited to, an LCD-based projector, an LED-based projector, an OLED-based projector, an LCoS-based projector, a Digital Light Processing (DLP)-based projector, and a laser projector.

Optionally, the given XR image has a uniform angular resolution. Alternatively, optionally, the given XR image has a variable angular resolution, wherein a first region of the given XR image has a lower angular resolution than a second region of the given XR image. The variable angular resolution emulates foveation properties of the human visual system in a fixed manner (when the second region corresponds to a central region of the given XR image and the first region corresponds to a peripheral region surrounding the central region), or in a dynamic manner (when the second region corresponds to a gaze region of the user in the given XR image and the first region corresponds to a remaining region surrounding the gaze region). The gaze region of the user can be determined using gaze-tracking data collected by a gaze-tracking unit (implemented, for example, as contact lenses with sensors, cameras monitoring a position of a pupil of the user's eye, or similar). The term "angular resolution" of a given region of a given image refers to a number of pixels per degree (also referred to as points per degree (PPD)) in the given region. Notably, a high angular resolution of the given region is indicative of a high visual detail of the given region.

The present disclosure also relates to the method as described above. Various embodiments and variants disclosed above, with respect to the aforementioned first aspect, apply mutatis mutandis to the method.

Optionally, the method further comprises synchronising the first camera and the second camera in at least one of: exposure time, auto exposure, auto white balance, radiometric calibration, image signal processing.

Optionally, in the method, the step of analysing comprises:
  dividing the first image and the second image into a plurality of first sub-areas and a plurality of second sub-areas, respectively;
  detecting whether or not a magnitude of a difference between a luminance of a given first sub-area in the first image and a luminance of a corresponding second sub-area in the second image exceeds a first threshold difference; and
  when it is detected that the magnitude of said difference exceeds the first threshold difference, determining one of the given first sub-area and the corresponding second sub-area whose luminance is higher than the luminance of other of the given first sub-area and the corresponding second sub-area, and identifying the determined one of the given first sub-area and the corresponding second sub-area to have a visual artifact.

Optionally, in the method, the step of analysing comprises:
  dividing a given image into a plurality of sub-areas;
  detecting whether or not a magnitude of a difference between a luminance of a given sub-area in the given image and a luminance of at least one other sub-area neighbouring the given sub-area exceeds a second threshold difference; and
  when it is detected that the magnitude of said difference exceeds the second threshold difference, determining one of the given sub-area and the at least one other sub-area whose luminance is higher than the luminance of other of the given sub-area and the at least one other sub-area, and identifying the determined one of the given sub-area and the at least one other sub-area to have a visual artifact.

Optionally, in the method, the step of analysing is performed based on information pertaining to at least one light source present in the real-world environment, said information comprising at least one of: a location of the at least one light source in the real-world environment, a direction in which light emanating from the at least one light source is directed within the real-world environment, an intensity of the light emanating from the at least one light source, a wavelength of the light emanating from the at least one light source, a shape of the at least one light source.

Optionally, in the method, a given image is captured using a default exposure setting of a given camera, and wherein the given camera is employed to capture at least one underexposed image using an adjusted exposure setting of the given camera, wherein the step of analysing comprises:
dividing the given image and the at least one underexposed image into a plurality of sub-areas and a plurality of underexposed sub-areas, respectively;
detecting whether or not a magnitude of a difference between a luminance of a given sub-area in the given image and a luminance of a corresponding underexposed sub-area in the at least one underexposed image exceeds a third threshold difference; and
when it is detected that the magnitude of said difference exceeds the third threshold difference, identifying the given sub-area of the given image to have a visual artifact.

Optionally, in the method, the step of analysing comprises determining a shape of the at least one visual artifact based on a shape of an aperture of a given camera.

Optionally, a given camera is employed to capture a plurality of consecutive images, wherein the method further comprises:
processing pose-tracking data, collected by pose-tracking means, to track a pose of the given camera;
determining a first motion vector representing a movement of the given camera, based on the tracked pose of the given camera;
determining a second motion vector representing a change in a position of a given visual artifact across the plurality of consecutive images;
detecting whether or not an angle between the first motion vector and the second motion vector exceeds a threshold angle; and
when it is detected that the angle between the first motion vector and the second motion vector exceeds the threshold angle, discarding the given visual artifact.

Optionally, the method further comprises:
detecting whether or not a shape of the given visual artifact changes across the plurality of consecutive images; and
when it is detected that the angle between the first motion vector and the second motion vector does not exceed the threshold angle, but the shape of the given visual artifact changes across the plurality of consecutive images, discarding the given visual artifact.

Optionally, the method further comprises:
accessing, from a data repository, a lighting model of the real-world environment;
detecting whether or not a magnitude of a difference between a luminance of the first image and a luminance of the second image exceeds a fourth threshold difference; and
when it is detected that the magnitude of said difference exceeds the fourth threshold difference, determining, based on the lighting model of the real-world environment, if any of the first camera and the second camera has moisture or dirt.

Optionally, in the method, the step of analysing comprises:
dividing the first image and the second image into a plurality of first sub-areas and a plurality of second sub-areas, respectively;
detecting whether or not a magnitude of a difference between a colour value of a given first sub-area in the first image and a colour value of a corresponding second sub-area in the second image exceeds a threshold colour difference; and
when it is detected that the magnitude of said difference exceeds the threshold colour difference, determining one of the given first sub-area and the corresponding second sub-area whose colour value is higher than the colour value of other of the given first sub-area and the corresponding second sub-area, and identifying the determined one of the given first sub-area and the corresponding second sub-area to have a visual artifact.

DETAILED DESCRIPTION OF THE DRAWINGS

Figure 1:
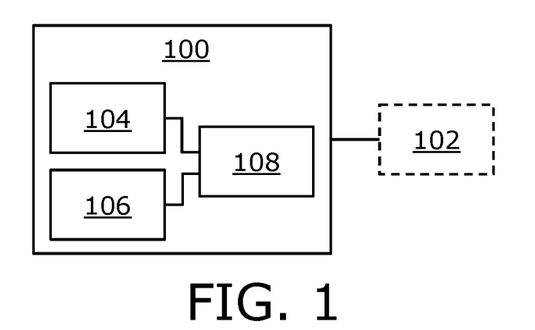
FIGS. 1 and 2 illustrate block diagrams of architectures of an imaging system for correcting visual artifacts during production of extended-reality images for a display apparatus, in accordance with different embodiments of the present disclosure.

Referring to FIG. 1, illustrated is a block diagram of architecture of an imaging system 100 for correcting visual artifacts during production of extended-reality images for a display apparatus 102, in accordance with an embodiment of the present disclosure. The imaging system 100 comprises at least a first camera and a second camera (depicted as the first camera 104 and the second camera 106) and at least one processor (depicted as a processor 108). The processor 108 is communicably coupled to the first camera 104 and the second camera 106.

Figure 2:
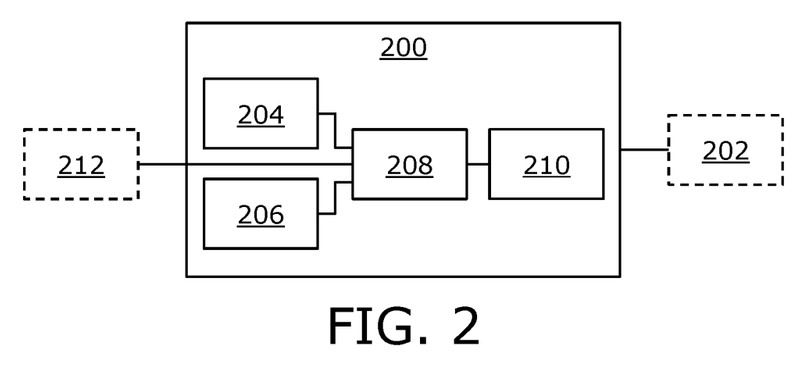

Referring to FIG. 2, illustrated is a block diagram of architecture of an imaging system 200 for correcting visual artifacts during production of extended-reality images for a display apparatus 202, in accordance with another embodiment of the present disclosure. The imaging system 200 comprises at least a first camera and a second camera (depicted as the first camera 204 and the second camera 206), at least one processor (depicted as a processor 208), and pose-tracking means 210. The processor 208 is communicably coupled to the first camera 204, the second camera 206, the pose-tracking means 210, and a data repository 212.

It may be understood by a person skilled in the art that the FIGS. 1 and 2 includes simplified architectures of imaging systems 100 and 200 for sake of clarity, which should not unduly limit the scope of the claims herein. The person skilled in the art will recognize many variations, alternatives, and modifications of embodiments of the present disclosure.

Figure 3:
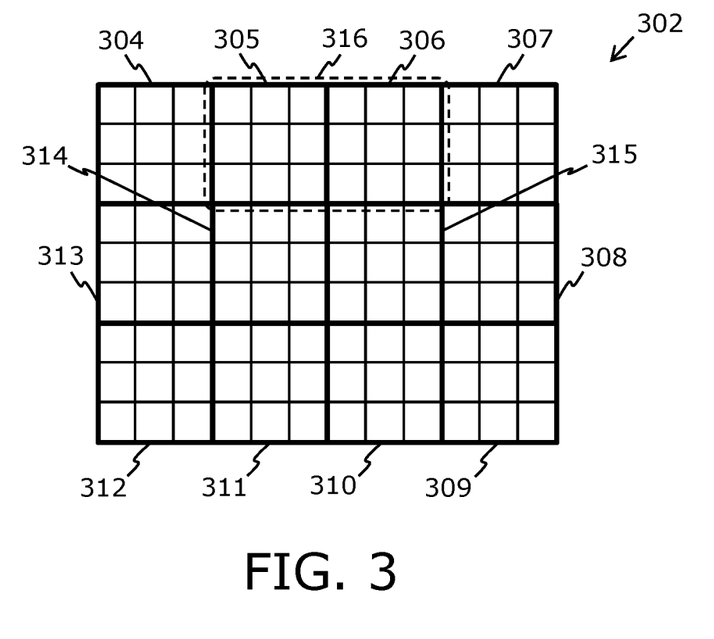
FIG. 3 illustrates an exemplary given image having a visual artifact, in accordance with an embodiment of the present disclosure.

Referring to FIG. 3, illustrated is an exemplary given image 302 having a visual artifact, in accordance with an embodiment of the present disclosure. The "given image" may be understood to be one of a first image and a second image. At least one processor (not shown) is configured to divide the given image 302 into 12 sub-areas 304, 305, 306, 307, 308, 309, 310, 311, 312, 313, 314, and 315, wherein each sub-area comprises, for example, 9 pixels. Herein, upon analyzing the given image to identify a visual artifact, it may be determined that the sub-areas 305 and 306 in the given image 302 have the visual artifact. In such a case, the sub-areas 305 and 306 collectively constitute an image segment 316 (depicted as a dashed rectangle) that corresponds to the visual artifact. The image segment 316 is a continuous image segment.

Referring to FIGS. 4A, 4B, 4C, 4D, and 4E, illustrated are five exemplary visual artifacts 402, 404, 406, 408, and 410 based on five different shapes of apertures 412, 414, 416, 418, and 420, respectively, of a given camera (not shown), in accordance with an embodiment of the present disclosure.

Figure 4A:
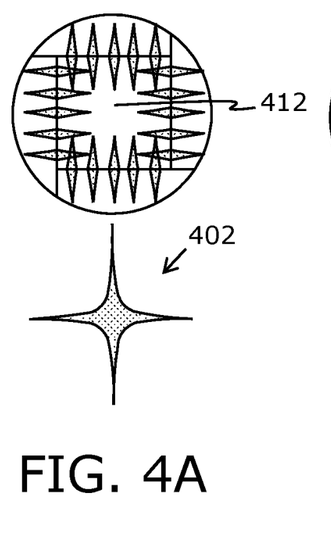
FIGS. 4A, 4B, 4C, 4D, and 4E illustrate five exemplary visual artifacts based on five shapes of apertures of a given camera, in accordance with an embodiment of the present disclosure.
Figure 4B:
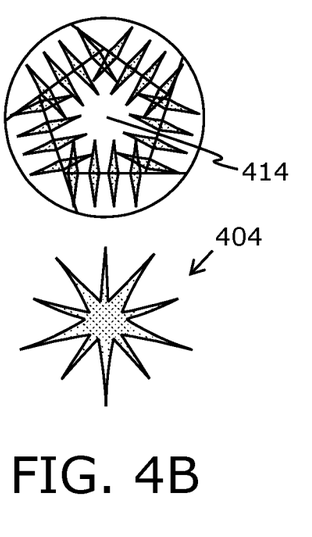
Figure 4C:
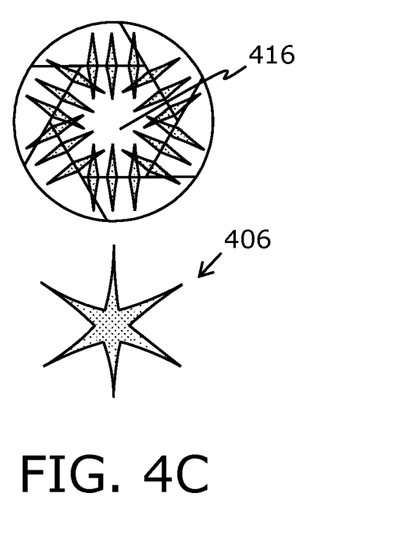
Figure 4D:
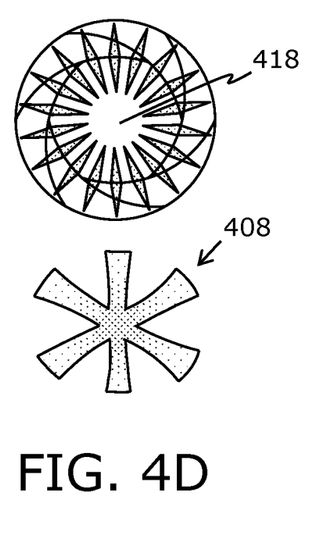
Figure 4E:
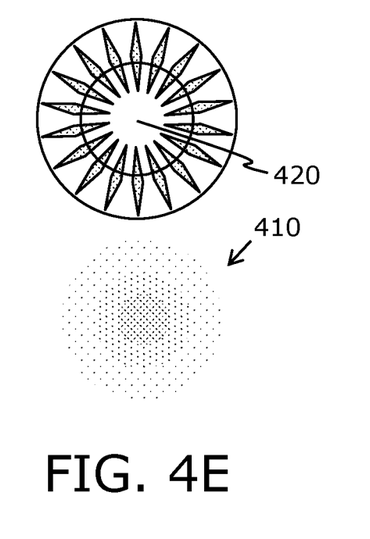

In FIG. 4A, a shape of the aperture 412 of the given camera is a square (i.e. a non-circular shape) having an even number of sides (i.e. four sides). Herein, the visual artifact 402 is produced as two flares having a total of four bright streaks of light, wherein the two flares overlap, and the four bright streaks are mutually perpendicular to each other. In FIG. 4B, a shape of the aperture 414 of the given camera is a pentagon (i.e. a non-circular shape) having an odd number of sides (i.e. five sides). Herein, the visual artifact 404 is produced as five flares having ten bright streaks of light that overlap to form a shape of a star. In FIG. 4C, a shape of the aperture 416 of the given camera is a regular hexagon (i.e. a non-circular shape) having an even number of sides (i.e. six sides). Herein, the visual artifact 406 is produced as three flares having six bright streaks of light that overlap to form a shape of a star. In FIG. 4D, a shape of the aperture 418 of the given camera is a rounded hexagon (i.e. a non-circular shape) having an even number of sides (i.e. six sides). Herein, the visual artifact 408 is produced as three flares having six bright, rounded and thick streaks of light that overlap to form a shape of a rounded star. In FIG. 4E, a shape of the aperture 420 of the given camera is a circle which can be considered to have an infinite number of sides. Herein, the visual artifact 410 is shown as a ghost or a circular halo which is fading out gradually on going away from its centre towards its periphery.

Figure 5:
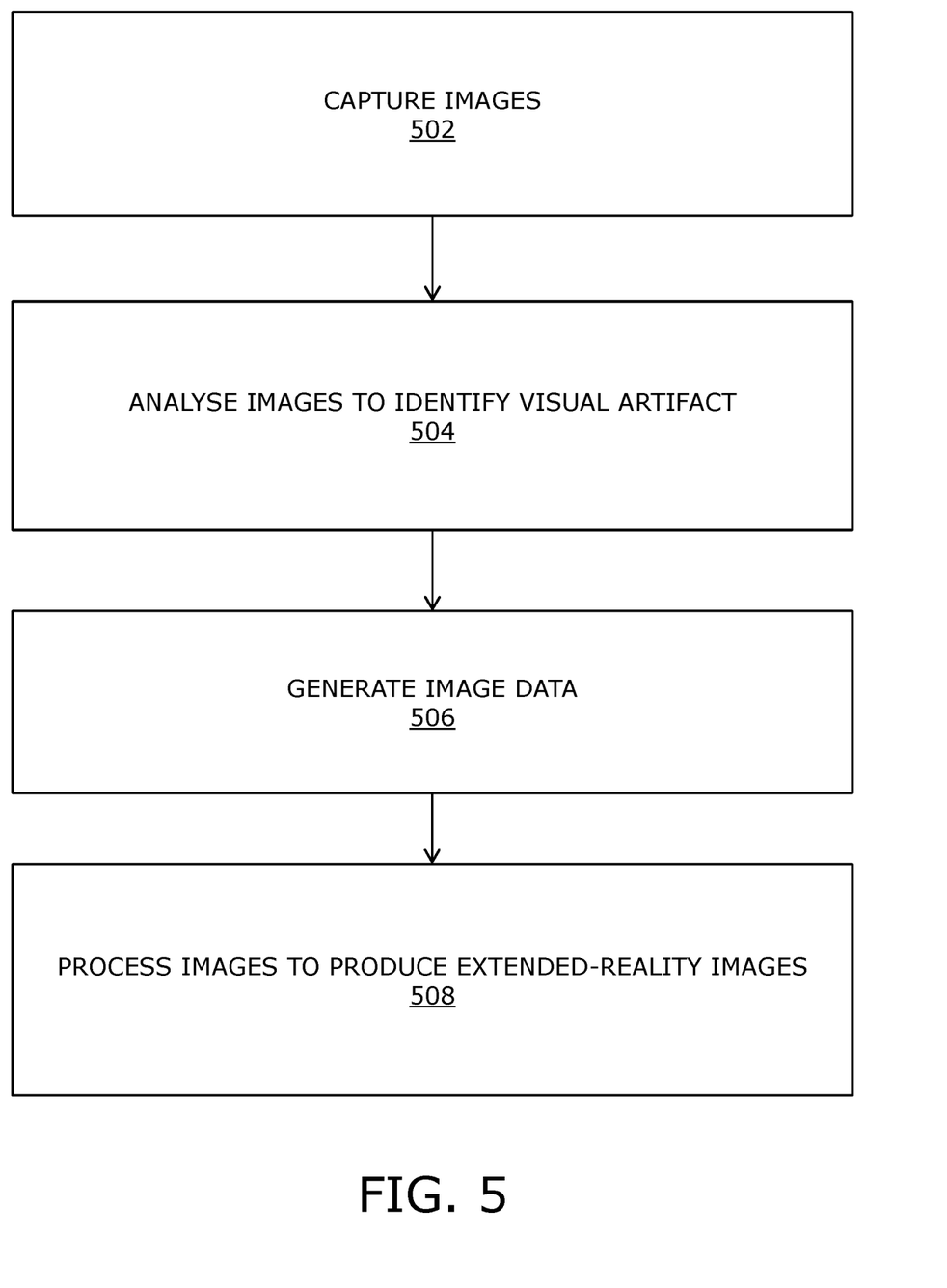
FIG. 5 illustrates steps of a method for correcting visual artifacts during production of extended-reality images for a display apparatus, in accordance with an embodiment of the present disclosure.

Referring to FIG. 5, illustrated are steps of a method for correcting visual artifacts during production of extended-reality images for a display apparatus. At step 502, a first image and a second image of a real-world environment are captured contemporaneously, via at least a first camera and a second camera, respectively. At step 504, the first image and the second image are analysed to identify at least one visual artifact present in one of the first image and the second image, and an image segment of the one of the first image and the second image that corresponds to the at least one visual artifact is determined. At step 506, image data for the image segment of the one of the first image and the second image is generated, based on at least one of: information pertaining to a virtual object that is to be virtually superimposed over at least a portion of the image segment, at least one other image segment neighbouring the image segment in the one of the first image and the second image, a corresponding image segment of other of the first image and the second image, at least one previous extended-reality image, a photogrammetric model of the real-world environment. At step 508, the one of the first image and the second image is processed, based on the generated image data, to produce a given extended-reality image to be presented at the display apparatus.

The steps 502, 504, 506, and 508 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system for correcting visual artifacts during production of extended-reality images for a display apparatus, the imaging system comprising:
    at least a first camera and a second camera that are employed to capture contemporaneously a first image and a second image of a real-world environment, respectively; and
    at least one processor configured to:
        analyse the first image and the second image to identify at least one visual artifact present in one of the first image and the second image and determine an image segment of the one of the first image and the second image that corresponds to the at least one visual artifact;
        divide the first image and the second image into a plurality of first sub-areas and a plurality of second sub-areas, respectively;
        detect whether or not a magnitude of a difference between a luminance of a given first sub-area in the first image and a luminance of a corresponding second sub-area in the second image exceeds a first threshold difference; and
        when it is detected that the magnitude of said difference exceeds the first threshold difference, determine one of the given first sub-area and the corresponding second sub-area whose luminance is higher than the luminance of other of the given first sub-area and the corresponding second sub-area, and identify the determined one of the given first sub-area and the corresponding second sub-area to have a visual artifact;
        generate image data for the image segment of the one of the first image and the second image, based on at least one of: information pertaining to a virtual object that is to be virtually superimposed over at least a portion of the image segment, at least one other image segment neighbouring the image segment in the one of the first image and the second image, a corresponding image segment in other of the first image and the second image, at least one previous extended-reality image, a photogrammetric model of the real-world environment; and
        process the one of the first image and the second image, based on the generated image data, to produce a given extended-reality image to be presented at the display apparatus.

2. The imaging system of claim 1, wherein the first camera and the second camera are synchronised in at least one of: exposure time, auto exposure, auto white balance, radiometric calibration, image signal processing.

3. The imaging system of claim 1, wherein, when analysing, the at least one processor is configured to:
    divide a given image into a plurality of sub-areas;
    detect whether or not a magnitude of a difference between a luminance of a given sub-area in the given image and a luminance of at least one other sub-area neighbouring the given sub-area exceeds a second threshold difference; and
    when it is detected that the magnitude of said difference exceeds the second threshold difference, determine one of the given sub-area and the at least one other sub-area whose luminance is higher than the luminance of other of the given sub-area and the at least one other sub-area, and identify the determined one of the given sub-area and the at least one other sub-area to have a visual artifact.

4. The imaging system of claim 1, wherein the at least one processor is configured to analyse the first image and the second image to identify the at least one visual artifact, based on information pertaining to at least one light source present in the real-world environment, said information comprising at least one of: a location of the at least one light source in the real-world environment, a direction in which light emanating from the at least one light source is directed within the real-world environment, an intensity of the light emanating from the at least one light source, a wavelength of the light emanating from the at least one light source, a shape of the at least one light source.

5. The imaging system of claim 1, wherein a given image is captured using a default exposure setting of a given camera, and wherein the given camera is to be employed to capture at least one underexposed image using an adjusted exposure setting of the given camera, wherein, when analysing, the at least one processor is configured to:
 divide the given image and the at least one underexposed image into a plurality of sub-areas and a plurality of underexposed sub-areas, respectively;
 detect whether or not a magnitude of a difference between a luminance of a given sub-area in the given image and a luminance of a corresponding underexposed sub-area in the at least one underexposed image exceeds a third threshold difference; and
 when it is detected that the magnitude of said difference exceeds the third threshold difference, identify the given sub-area of the given image to have a visual artifact.

6. The imaging system of claim 1, wherein, when analysing, the at least one processor is configured to determine a shape of the at least one visual artifact based on a shape of an aperture of a given camera.

7. The imaging system of claim 1, further comprising pose-tracking means, a given camera being employed to capture a plurality of consecutive images, wherein the at least one processor is configured to:
 process pose-tracking data, collected by the pose-tracking means, to track a pose of the given camera;
 determine a first motion vector representing a movement of the given camera, based on the tracked pose of the given camera;
 determine a second motion vector representing a change in a position of a given visual artifact across the plurality of consecutive images;
 detect whether or not an angle between the first motion vector and the second motion vector exceeds a threshold angle; and
 when it is detected that the angle between the first motion vector and the second motion vector exceeds the threshold angle, discard the given visual artifact.

8. The imaging system of claim 7, wherein the at least one processor is configured to:
 detect whether or not a shape of the given visual artifact changes across the plurality of consecutive images; and
 when it is detected that the angle between the first motion vector and the second motion vector does not exceed the threshold angle, but the shape of the given visual artifact changes across the plurality of consecutive images, discard the given visual artifact.

9. The imaging system of claim 1, wherein the at least one processor is configured to:
 access, from a data repository, a lighting model of the real-world environment;
 detect whether or not a magnitude of a difference between a luminance of the first image and a luminance of the second image exceeds a fourth threshold difference; and
 when it is detected that the magnitude of said difference exceeds the fourth threshold difference, determine, based on the lighting model of the real-world environment, if any of the first camera and the second camera has moisture or dirt.

10. The imaging system of claim 1, wherein, when analysing, the at least one processor is configured to:
 divide the first image and the second image into a plurality of first sub-areas and a plurality of second sub-areas, respectively;
 detect whether or not a magnitude of a difference between a colour value of a given first sub-area in the first image and a colour value of a corresponding second sub-area in the second image exceeds a threshold colour difference; and
 when it is detected that the magnitude of said difference exceeds the threshold colour difference, determine one of the given first sub-area and the corresponding second sub-area whose colour value is higher than the colour value of other of the given first sub-area and the corresponding second sub-area, and identify the determined one of the given first sub-area and the corresponding second sub-area to have a visual artifact.

11. A method for correcting visual artifacts during production of extended-reality images for a display apparatus, the method comprising:
 capturing contemporaneously, via at least a first camera and a second camera, a first image and a second image of a real-world environment, respectively;
 analysing the first image and the second image to identify at least one visual artifact present in one of the first image and the second image and determine an image segment of the one of the first image and the second image that corresponds to the at least one visual artifact;
 dividing the first image and the second image into a plurality of first sub-areas and a plurality of second sub-areas, respectively;
 detecting whether or not a magnitude of a difference between a luminance of a given first sub-area in the first image and a luminance of a corresponding second sub-area in the second image exceeds a first threshold difference; and
 when it is detected that the magnitude of said difference exceeds the first threshold difference, determining one of the given first sub-area and the corresponding second sub-area whose luminance is higher than the luminance of other of the given first sub-area and the corresponding second sub-area, and identifying the determined one of the given first sub-area and the corresponding second sub-area to have a visual artifact;
 generating image data for the image segment of the one of the first image and the second image, based on at least one of: information pertaining to a virtual object that is to be virtually superimposed over at least a portion of the image segment, at least one other image segment neighbouring the image segment in the one of the first image and the second image, a corresponding image segment of other of the first image and the second image, at least one previous extended-reality image, a photogrammetric model of the real-world environment; and processing the one of the first image and the second image, based on the generated image data, to produce a given extended-reality image to be presented at the display apparatus.

12. The method of claim 11, further comprising synchronising the first camera and the second camera in at least one of: exposure time, auto exposure, auto white balance, radiometric calibration, image signal processing.

13. The method of claim 11, wherein the step of analysing comprises:

dividing a given image into a plurality of sub-areas;

detecting whether or not a magnitude of a difference between a luminance of a given sub-area in the given image and a luminance of at least one other sub-area neighbouring the given sub-area exceeds a second threshold difference; and when it is detected that the magnitude of said difference exceeds the second threshold difference, determining one of the given sub-area and the at least one other sub-area whose luminance is higher than the luminance of other of the given sub-area and the at least one other sub-area, and identifying the determined one of the given sub-area and the at least one other sub-area to have a visual artifact.

14. The method of claim 11, wherein the step of analysing is performed based on information pertaining to at least one light source present in the real-world environment, said information comprising at least one of: a location of the at least one light source in the real-world environment, a direction in which light emanating from the at least one light source is directed within the real-world environment, an intensity of the light emanating from the at least one light source, a wavelength of the light emanating from the at least one light source, a shape of the at least one light source.

15. The method of claim 11, wherein a given image is captured using a default exposure setting of a given camera, and wherein the given camera is employed to capture at least one underexposed image using an adjusted exposure setting of the given camera, wherein the step of analysing comprises:

dividing the given image and the at least one underexposed image into a plurality of sub-areas and a plurality of underexposed sub-areas, respectively;

detecting whether or not a magnitude of a difference between a luminance of a given sub-area in the given image and a luminance of a corresponding underexposed sub-area in the at least one underexposed image exceeds a third threshold difference; and when it is detected that the magnitude of said difference exceeds the third threshold difference, identifying the given sub-area of the given image to have a visual artifact.

16. The method of claim 11, wherein the step of analysing comprises determining a shape of the at least one visual artifact based on a shape of an aperture of a given camera.

17. The method of claim 11, wherein a given camera is employed to capture a plurality of consecutive images, the method further comprising:

processing pose-tracking data, collected by pose-tracking means, to track a pose of the given camera;

determining a first motion vector representing a movement of the given camera, based on the tracked pose of the given camera;

determining a second motion vector representing a change in a position of a given visual artifact across the plurality of consecutive images;

detecting whether or not an angle between the first motion vector and the second motion vector exceeds a threshold angle; and when it is detected that the angle between the first motion vector and the second motion vector exceeds the threshold angle, discarding the given visual artifact.

18. The method of claim 17, further comprising:

detecting whether or not a shape of the given visual artifact changes across the plurality of consecutive images; and when it is detected that the angle between the first motion vector and the second motion vector does not exceed the threshold angle, but the shape of the given visual artifact changes across the plurality of consecutive images, discarding the given visual artifact.

19. The method of claim 11, further comprising:

accessing, from a data repository, a lighting model of the real-world environment;

detecting whether or not a magnitude of a difference between a luminance of the first image and a luminance of the second image exceeds a fourth threshold difference; and when it is detected that the magnitude of said difference exceeds the fourth threshold difference, determining, based on the lighting model of the real-world environment, if any of the first camera and the second camera has moisture or dirt.

20. The method of claim 11, wherein the step of analysing comprises:

dividing the first image and the second image into a plurality of first sub-areas and a plurality of second sub-areas, respectively;

detecting whether or not a magnitude of a difference between a colour value of a given first sub-area in the first image and a colour value of a corresponding second sub-area in the second image exceeds a threshold colour difference; and when it is detected that the magnitude of said difference exceeds the threshold colour difference, determining one of the given first sub-area and the corresponding second sub-area whose colour value is higher than the colour value of other of the given first sub-area and the corresponding second sub-area, and identifying the determined one of the given first sub-area and the corresponding second sub-area to have a visual artifact.

* * * * *